United States Patent [19]
Hsieh

[11] Patent Number: 5,562,347
[45] Date of Patent: Oct. 8, 1996

[54] STRUCTURE FOR A BRUSHLESS DIRECT CURRENT FAN

[76] Inventor: Hsin-mao Hsieh, No. 6, East Section, Chiao Nan Li, Industrial 6th Rd., Pingtung, Taiwan

[21] Appl. No.: 491,599

[22] Filed: Jun. 16, 1995

[51] Int. Cl.⁶ .......................... F16C 35/02; F16C 35/077
[52] U.S. Cl. .................. 384/215; 384/296; 384/428; 384/539
[58] Field of Search .................................. 384/215, 276, 384/295, 296, 428, 537, 539, 584, 585

[56] References Cited

U.S. PATENT DOCUMENTS

| | | | |
|---|---|---|---|
| 4,682,065 | 7/1987 | English et al. | 384/539 X |
| 4,783,608 | 11/1988 | Gruber et al. | 384/296 X |
| 5,061,091 | 10/1991 | Shiratori | 384/539 |

Primary Examiner—Thomas R. Hannon
Attorney, Agent, or Firm—Bacon & Thomas

[57] ABSTRACT

A bearing system for a brushless direct current fan includes a bearing pedestal having a first chamber for receiving a plurality of bearings and a plurality of tongues protruding from an inner wall of the first chamber and a second chamber communicated with the first chamber with an inner diameter larger than an inner diameter of the first chamber and a flexible sleeve having a plurality of slots axially extending from a first end of the sleeve to an intermediate position of the sleeve for the corresponding tongues within the pedestal to extend through so that the sleeve is engaged by the pedestal and a plurality of feet protrude from the first end of the sleeve for engaging with an intersection edge between the first chamber and the second chamber of the pedestal thereby securing the sleeve in the pedestal.

3 Claims, 3 Drawing Sheets

5,562,347

STRUCTURE FOR A BRUSHLESS DIRECT CURRENT FAN

BACKGROUND OF THE INVENTION

The present invention relates to a brushless direct current fan, and particularly to a bearing system for brushless direct current fans.

Direct current fans are often used in small-size electrical appliances such as a personal computer. A direct current fan includes a rotor, a stator, and a frame supporting the rotor and the stator. The rotor is rotatably mounted on the stator by means of a bearing system. The bearing system includes a shaft axially mounted on the rotor, a plurality of bearings rotatably holding the shaft, and a bearing pedestal tightly receiving the bearings.

As the bearing pedestal is formed by injection molding, the formed bearing pedestals could possibly produce a misalignment after long-term utilization. Thus, an off center is induced between the bearings, greater abrasion between the shaft and inner walls of the bearings will occur when the shaft rotates.

Further, as the bearings have to be tightly fitted in the bearing pedestal, the bearing pedestal has to be superior in shape accuracy and size accuracy. And, as the bearing pedestal is integrally formed with the frame, if a misalignment is presented in the bearing pedestal, the frame will be considered defective and not suitable for utilization.

SUMMARY OF THE INVENTION

An object of the present invention is to provide a novel direct current fan which accepts a frame with less precisive requirements.

Another object of the present invention is to provide a novel direct current fan which can be easily assembled and allows for different types of bearing combinations.

According to the present invention, a bearing system includes a bearing pedestal, a lamination with a plurality of windings secured onto the bearing pedestal, and a flexible sleeve received by the bearing pedestal for receiving a plurality of bearings. A plurality of slots are provided on a first end of the sleeve, a plurality of slits are defined on a second end of the sleeve, and a plurality of tongues radially protrude from an inner wall of the bearing pedestal corresponding to the slots on the sleeve for engaging with the slots of the sleeve so that the sleeve is secured within the bearing pedestal and the demand for size accuracy of the bearing pedestal is reduced.

Other objects, advantages, and novel features of the invention will become more apparent from the following detailed description when taken in conjunction with the accompanying drawings.

DETAILED DESCRIPTION OF THE PREFERRED EMBODIMENTS

Figure 4:
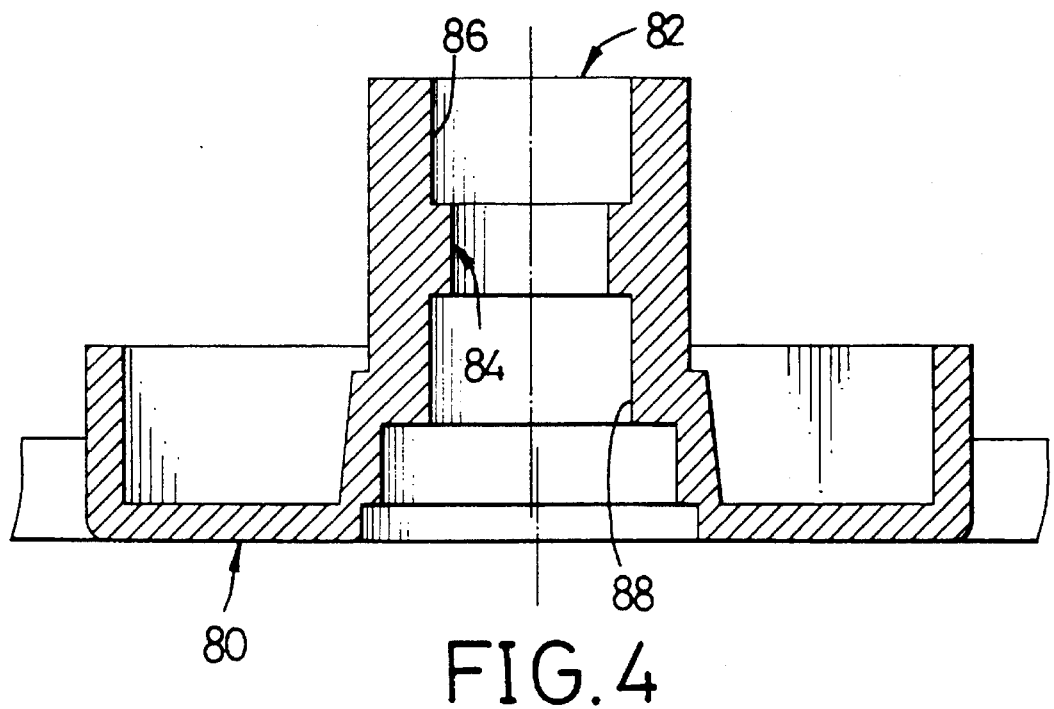
FIG. 4 is a cross-sectional view of a conventional bearing pedestal for a brushless direct current fan.
Figure 5:
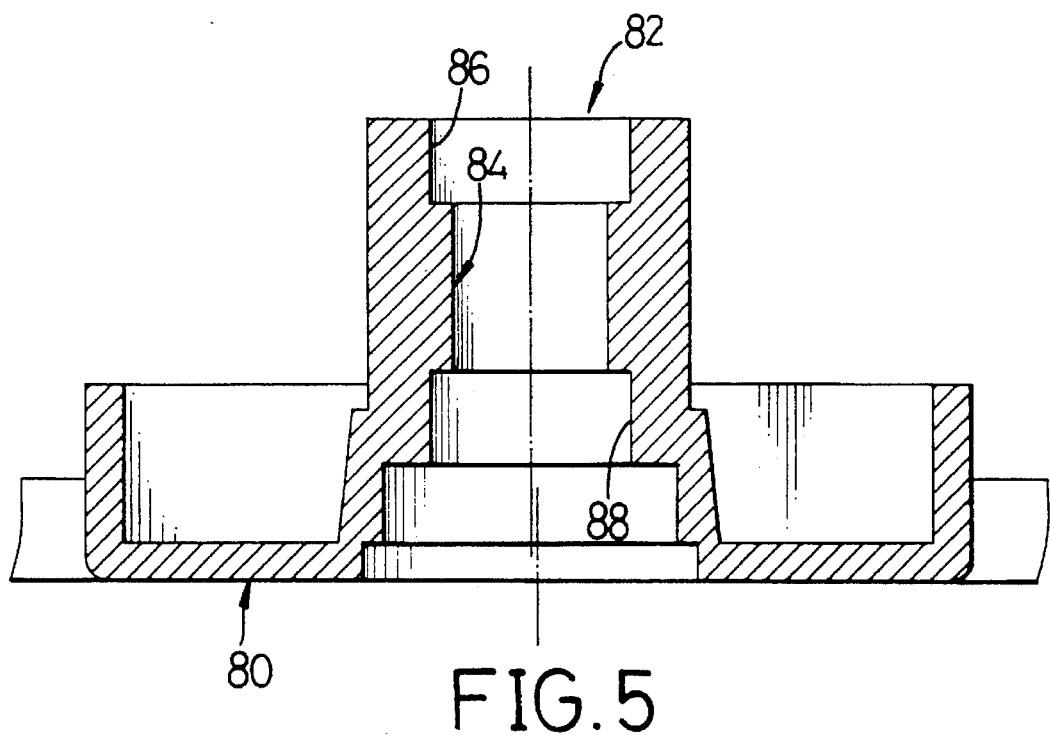
FIG. 5 is a cross-sectional view of another conventional bearing pedestal for a brushless direct current fan.

Referring to FIGS. 4 and 5, cross-sectional views of conventional bearing pedestals for ball bearings and self-lubricating bearings are shown. Respectively shown in the drawings, an integrally formed bearing pedestal 80 has a bore 82 composed of a plurality of cylindrical chambers of different diameters for a shaft to extend through. A chamber 84 is defined at an intermediate position of the bore 82. An upper chamber 86 and a lower chamber 88 separated by the chamber 84 are provided for tightly receiving bearings (not shown). A difference between the chambers 84 of the bearing pedestals of FIGS. 4 and 5 is that the height of the chamber 84 (in FIG. 5) used for the self-lubricating bearings is longer than that (in FIG. 4) used for the ball bearings.

However, as both types of the bearing pedestals 80 are plastic and made by injection molding, molding tools for the bearing pedestal 80 will be worn out after long-term utilization. This results in central axes of the cylindrical chambers in the bore 82, 88 becoming misaligned. Thus, the shaft and the bearings will be in poor cooperation, and this reduces the lifetime of a direct current fan.

Further, as the bearing pedestal 80 and a frame of the direct current fan are integrally formed, thus, if a misalignment occurs in the bearing pedestal 80, the frame will be discarded.

Figure 1:
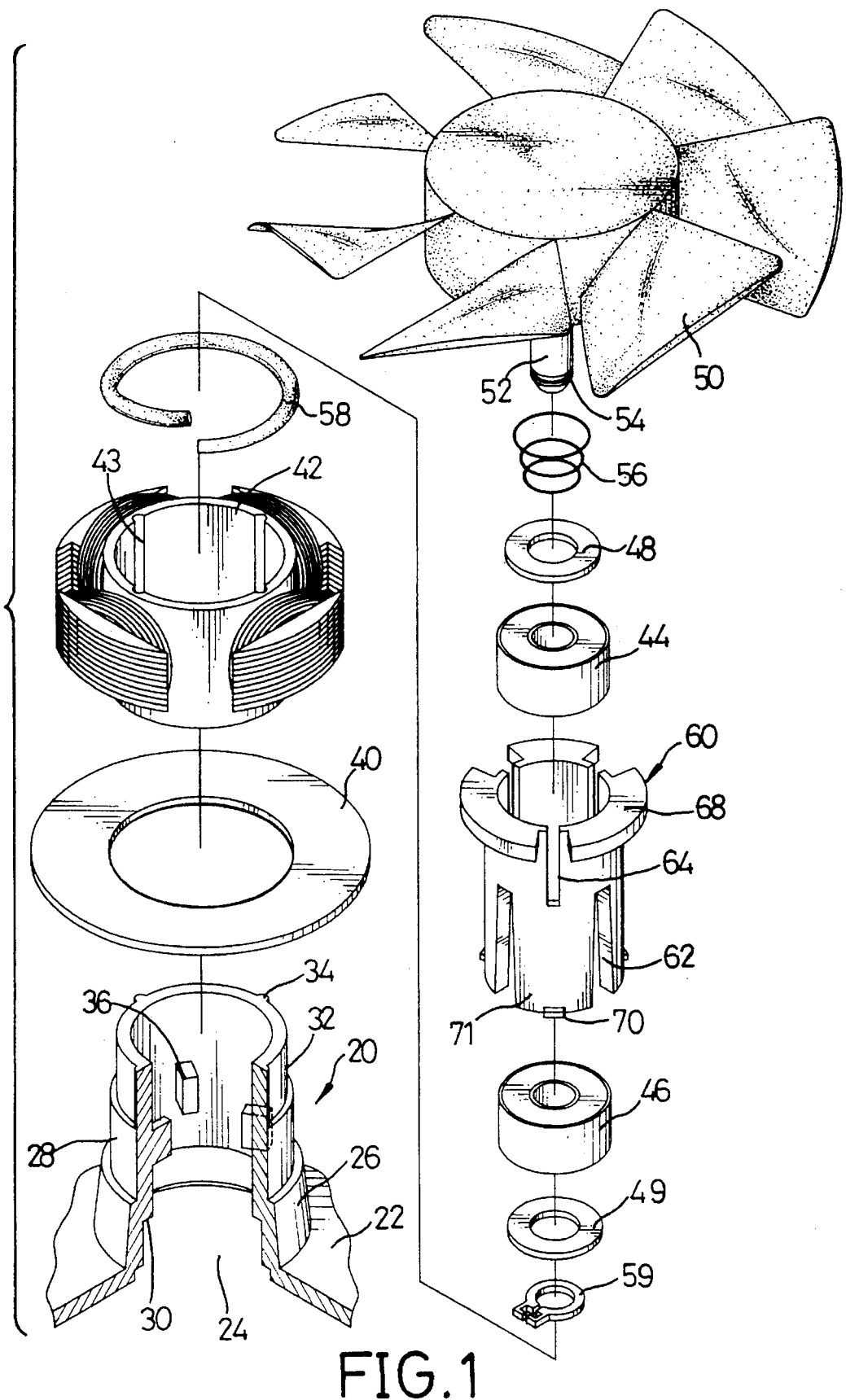
FIG. 1 is a perspective exploded view, partially in cross-section, of a bearing system of the present invention.

As shown in FIG. 1, a bearing system for securing bearings in accordance with this invention is shown, the bearing system includes a bearing pedestal 20, an annular circuit board 40, a lamination 42 wound with a plurality of windings for securing onto the bearing pedestal 20, two bearings 44, 46, a sleeve 60 for receiving the bearings 44, 46, two washers 48, 49, a rotor 50, a shaft 52 having a first end connected to the rotor 50 and a second end provided with an annular groove 54, a C clip 59, a spring 56, and a ring cushion 58.

The bearing pedestal 20 is integrally formed and composed of a plate 22, a circular hole 24 defined in the plate 22, a base tube 26 protruding from a peripheral defining the circular hole 24 of the plate 22, an intermediate tube 28 coupled with the base tube 26 by partially inserting into the base tube 26 with an edge 30 overlapped with an inner wall of the base tube 26, and an upper tube 32 axially protruding from a peripheral of the intermediate tube 28 with an inner wall common to that of the intermediate tube 28. A plurality of axial ribs 34 are integrally formed on an outer wall of the upper tube 32 and a plurality of tongues 36 radially protrude from an inner wall of the intermediate tube 28. The annular circuit board 40 has an inner diameter equal to the outer diameter of the intermediate tube 28.

The lamination 42 includes a cylindrical lamination with four teeth protruding from an outer wall of the lamination for the windings to be wound thereon. The cylindrical lamination has an inner diameter equal to an outer diameter of the upper tube 32 and a plurality of axial grooves 43 on an inner wall of the cylindrical lamination corresponding to the ribs 34 on the upper tube 32 and sized to marginally engage with the ribs 34 on the outer wall of the upper tube 32.

The sleeve 60 includes an elastic cylinder having a length marginally greater than that of the common inner wall of the intermediate tube 28 and the upper tube 32, an inner diameter equal to the outer diameter of the bearings 44, 46, and an outer diameter equal to the inner diameter of the upper tube 32. The sleeve 60 also has a wall thickness smaller than a height of the tongues 36 on the inner wall of the intermediate tube for the tongues to protrude from an inner wall of the sleeve 60 when the sleeve 60 is inserted into the pedestal 20. A plurality of slots 62 corresponding to the tongues 36 within the inner wall of the pedestal 20 are axially formed from a first end to an intermediate position of the sleeve 60 so that the tongues 36 may extend therethrough when the sleeve 60 is inserted into the pedestal and a plurality of bracket edges 71 are defined by the slots 62.

The sleeve 60 further includes a plurality of feet 70 radially protruding from the bracket edges of the first end of the sleeve 60 in a staggered relation to the slots 62, a plurality of axial slits 64 formed from a second end to the intermediate position of the sleeve 60 in an opposite relation to the feet 70, and a plurality of flanges 68 radially protruding from edges of the second end so that the sleeve 60 can be tightly received within the pedestal 20 by having the tongues 36 enter respective slots 62, the feet 70 engage with the edge 30 of the intermediate tube 28, and the flanges 68 cover a top edge of the pedestal 20.

The procedure of assembling the fan includes the following steps. Placing the annular circuit board 40 onto an intersection between the intermediate tube 28 and the base tube 26; securing the lamination 42 onto the upper tube 32 by having the grooves 43 within the inner wall of the lamination 42 engage with the ribs 34 on the upper tube 32; placing the ring cushion 58 on the lamination 42; aligning the slots 62 of the sleeve 60 to the tongues 36 within the inner wall of the intermediate tube 28; inserting the sleeve 60 into the bearing pedestal 20; having the feet 70 of the sleeve 60 engage with the edge 30 of the inner wall of the intermediate tube 28; placing the bearing 44, the washer 48, and the spring 56 into the sleeve 60, inserting the bearing 46 and the washer 49 into the sleeve 60, having the shaft 52 extend through a bore in the pedestal 20 loaded with the washers 48, 49 and the bearings 44, 46; and having the C clip 59 to engage with the annular groove 54 on the shaft 52 for securing the shaft 52 in place.

Figure 2:
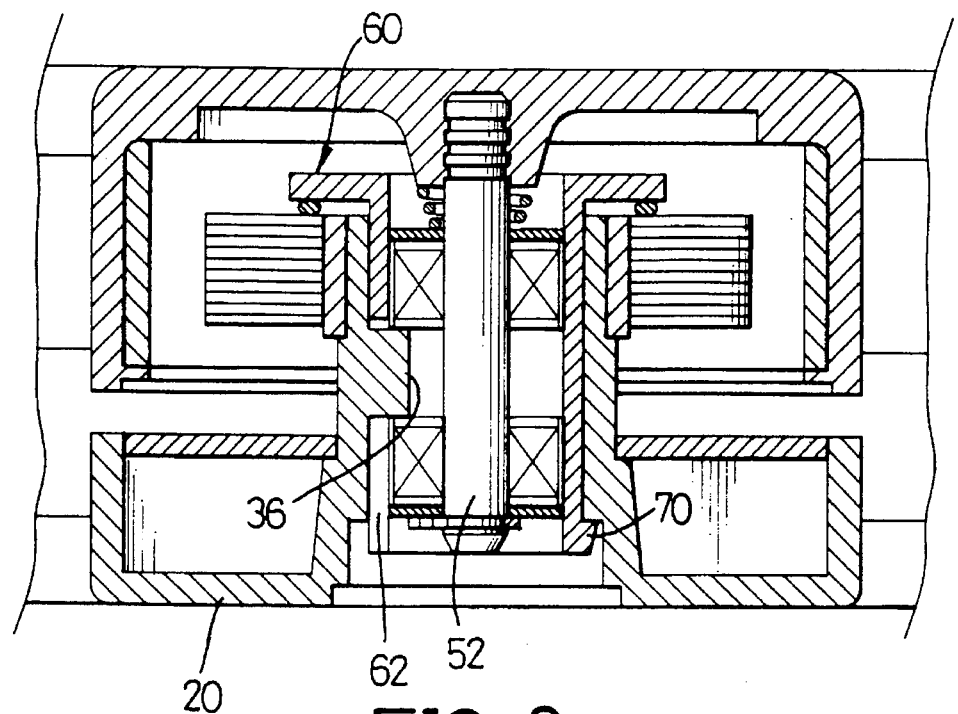
FIG. 2 is a cross-sectional view showing the system of FIG. 1 in cooperation with ball bearings.

As shown in FIG. 2, a bearing pedestal 20 of this invention is in combination with ball bearings 44, 46. The sleeve 60 is received by the bearing pedestal 20 and the tongues 36 protrude out of an inner wall of the slots 62 so that the bearings 44, 46 are separated by the tongues 36. The bearings 44, 46 are further secured by a combination of the washers 48, 49, the spring 56, and the C clip 59 thereby holding the shaft 52 in place. As the ball bearings 44, 46 are inserted within the sleeve 60, the sleeve 60 is slightly expanded so that the sleeve 60 is tightly engaged with the bearing pedestal 20.

Figure 3:
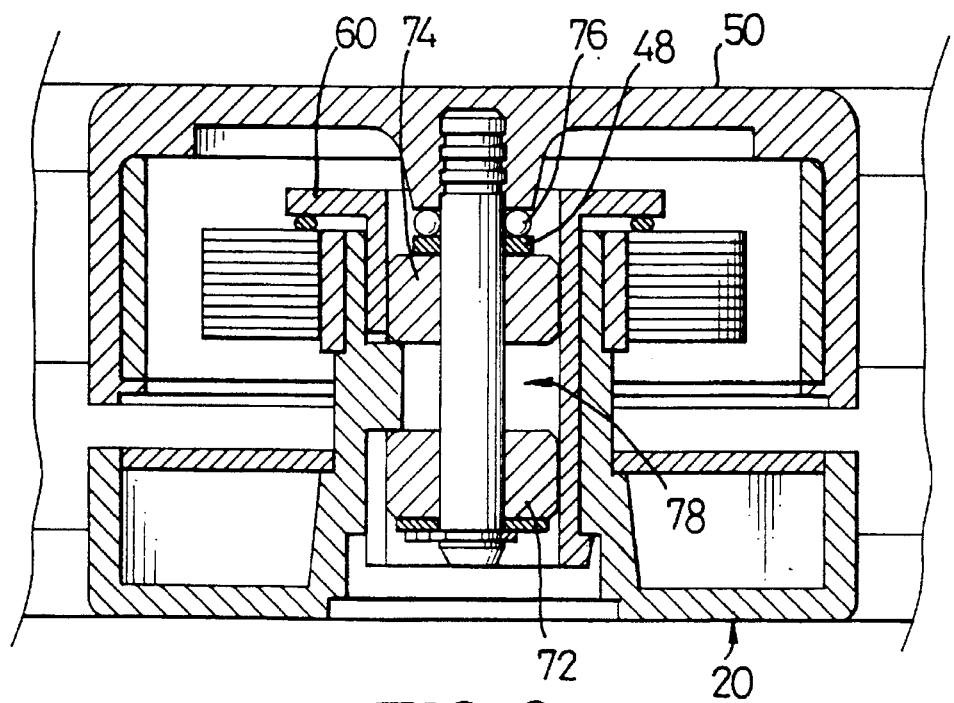
FIG. 3 is a cross-sectional view showing the system of FIG. 1 in cooperation with self-lubricating bearings.

As shown in FIG. 3, a bearing pedestal 20 of this invention is in combination with self-lubricating bearings 72, 74. An oil seal 76 is inserted between the rotor 50 and the washer 48. An oil chamber 78 is formed between the bearings 72, 74. As the self-lubricating bearings are inserted within the sleeve 60, the sleeve 60 is slightly expanded so that it is tightly engaged with the bearing pedestal 20.

Although the invention has been explained in relation to its preferred embodiment, it is to be understood that many other possible modifications and variations can be made without departing from the spirit and scope of the invention as hereinafter claimed.

I claim:

1. A bearing system for a brushless direct current fan comprising:

a bearing pedestal having a first chamber for receiving a plurality of bearings and a plurality of tongues protruding from an inner wall of the first chamber and a second chamber communicated with the first chamber with an inner diameter larger than an inner diameter of the first chamber; and a flexible sleeve having a plurality of slots axially extending from a first end of the sleeve to an intermediate position of the sleeve for the corresponding tongues within the pedestal to extend through so that the sleeve is engaged by the pedestal and a plurality of feet protrude from the first end of the sleeve for engaging with an edge of the first chamber communicated with the second chamber of the pedestal thereby securing the sleeve in the pedestal.

2. A bearing system as claimed in claim 1 further comprising a flange radially protruding from a second end of the sleeve.

3. A bearing system as claimed in claim 2 wherein said flange has a plurality of slits extending toward the intermediate position in an opposite relation to the feet.

\* \* \* \* \*